US010612237B1

(12) United States Patent
Gleason

(10) Patent No.: US 10,612,237 B1
(45) Date of Patent: Apr. 7, 2020

(54) COMPOSITE PANEL

(71) Applicant: Composite Technologies International, LLC, Anniston, AL (US)

(72) Inventor: Stephen S. Gleason, Burr Ridge, IL (US)

(73) Assignee: Composite Technologies International, LLC, Anniston, AL (US)

( * ) Notice: Subject to any disclaimer, the term of this patent is extended or adjusted under 35 U.S.C. 154(b) by 0 days.

(21) Appl. No.: 16/224,702

(22) Filed: Dec. 18, 2018

(51) Int. Cl.
| | |
|---|---|
| *E04C 2/24* | (2006.01) |
| *B29C 70/02* | (2006.01) |
| *B29C 70/22* | (2006.01) |
| *B29C 70/44* | (2006.01) |
| *B29C 70/54* | (2006.01) |
| *E04C 2/22* | (2006.01) |
| *E04C 2/284* | (2006.01) |
| *E04C 2/36* | (2006.01) |
| *E04B 2/00* | (2006.01) |
| *B29C 70/66* | (2006.01) |
| *E04C 2/00* | (2006.01) |
| *B29K 105/16* | (2006.01) |

(52) U.S. Cl.
CPC ............ *E04C 2/246* (2013.01); *B29C 70/023* (2013.01); *B29C 70/025* (2013.01); *B29C 70/22* (2013.01); *B29C 70/443* (2013.01); *B29C 70/541* (2013.01); *B29C 70/66* (2013.01); *E04C 2/22* (2013.01); *E04C 2/284* (2013.01); *E04C 2/36* (2013.01); *E04C 2/44* (2013.01); *B29K 2105/165* (2013.01); *E04C 2002/001* (2013.01)

(58) Field of Classification Search
None
See application file for complete search history.

(56) References Cited

U.S. PATENT DOCUMENTS

| | | | |
|---|---|---|---|
| 3,339,609 | A | 9/1967 | Cushman |
| 3,764,247 | A | 10/1973 | Garrett |
| 4,595,623 | A | 6/1986 | Du Pont |
| 5,242,637 | A | 9/1993 | Inoue |
| 5,254,598 | A | 10/1993 | Schlameus |
| 5,498,645 | A | 3/1996 | Mariano |

(Continued)

OTHER PUBLICATIONS

PCT International Search Report and Opinion for PCT/US18/67037, dated May 10, 2019.

(Continued)

*Primary Examiner* — Chinessa T. Golden
(74) *Attorney, Agent, or Firm* — Neustal Law Offices

(57) ABSTRACT

A composite panel for use in applications such as mobile homes, boats, busses, RVs, or other panels used typically in transportation applications, where a single piece, water resistant, lightweight panel with patterned high-strength areas is needed. The composite panel generally includes internal preforms made of low-density material such as urethane foam, which create patterned structural portions of the panel during the molding process. The patterned structural portions are formed by a maze-like region within a mold, into which composite matrix material is infused. The patterned structural portions have high strength compared to the other regions of the panel, and can be used for structural support or for retaining fasteners for appliances, walls, etc.

20 Claims, 9 Drawing Sheets

(56) References Cited

U.S. PATENT DOCUMENTS

| | | | |
|---|---|---|---|
| 5,665,785 | A | 9/1997 | McClellan |
| 5,741,574 | A | 4/1998 | Boyce |
| 6,545,066 | B1 | 4/2003 | Immordino, Jr. |
| 7,037,865 | B1 * | 5/2006 | Kimberly ............. B29C 70/60 264/103 |
| 7,150,915 | B2 | 12/2006 | Kia |
| 8,915,996 | B2 | 12/2014 | Novak |
| 9,217,072 | B2 | 12/2015 | Novak |
| 2008/0287575 | A1 | 11/2008 | Terry Lee |
| 2008/0292854 | A1 * | 11/2008 | Miller ............. C04B 38/0032 428/219 |
| 2010/0043955 | A1 | 2/2010 | Hornick |
| 2012/0125530 | A1 | 5/2012 | Hand |
| 2018/0155521 | A1 | 6/2018 | Gleason |

OTHER PUBLICATIONS https://www.youtube.com/watch?v=ZxzGSHdUadk>; YouTube Wepage "Making a Carbon Fiber Kiteboard—Hand Lay Up Composite-Vacuum Bagged-Foam Core"; Sep. 17, 2009.

* cited by examiner

COMPOSITE PANEL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a composite panel for replacing multi-part assemblies, such as floor boards or other parts of RVs, buses, aircraft, boats, etc.

Related Art

Any discussion of the related art throughout the specification should in no way be considered as an admission that such related art is widely known or forms part of common general knowledge in the field.

Structural panels have been in use for many years in constructing floor, ceiling, and wall panels for vehicles such as RVs, buses, tractor-trailers, boats, trains, and aircraft.

In the past, such panels have been manufactured from multiple components and fastened or bonded together to add strength, weather resistance, and other characteristics only where needed to save weight and cost. For example, it has been common in manufacturing RV floors to start with a bottom layer of plywood, onto which a series of welded tubes are placed in a particular pattern to allow holes to be drilled in the tubes to secure items such as cabinets, appliances, fixtures, etc. with screws or other fasteners.

Styrofoam has also typically been used in such panels to fill the open space between the welded tubes and to provide some additional support for a top plywood sheet that was placed on top of the welded tubes and Styrofoam. The top sheet was then fastened to the bottom sheet and the tubes. Next, the bottom sheet, which may be exposed to the road and weather, was coated to seal the floor system from moisture, dirt, etc.

Such RV floors may be costly, heavy and also require multiple assembly steps and a relatively high number of components, fasteners, etc., to be kept in inventory. Further, these panels are obviously not inherently water or weather resistant, and so must be treated to resist the elements, and they are still susceptible to interior parts deteriorating and possibly failing if water or dirt does eventually penetrate the exterior surfaces.

SUMMARY

An example embodiment is directed to a composite panel. The composite panel generally includes a first panel surface and a second panel surface, and at least one internal preform positioned within the panel between the first panel surface and the second panel surface, wherein the at least one internal preform is spaced apart from the first panel surface and the second panel surface and is positioned to at least partially create a patterned structural portion. The patterned structural portion comprises a cured composite matrix material that substantially surrounds the internal preform on at least two sides. The patterned structural portion is formed in part by a maze of voids in the mold cavity, and is generally stronger than the part of the panel system where the internal preform is positioned. The internal preform is generally very low density compared to the composite matrix material.

In another example embodiment of the composite panel, the patterned structural portion substantially surrounds the internal preform on at least four sides, and may surround it on six sides. The composite panel may further include a reinforcing layer (such as fiberglass scrim or other material) proximate the first panel surface, and may also include a second reinforcing layer proximate the second panel surface. In another example embodiment where a high quality finish is required, the composite panel may further include a gel coat layer over the first panel surface or the second panel surface.

In still another example embodiment, the first panel surface and the second panel surface of the composite panel are substantially coplanar. Further, the at least one internal preform may have two surfaces that are substantially coplanar with the first panel surface and the second panel surface. The composite panel may further comprise a plurality of spacers positioned between the internal preform and the first panel surface and between the internal preform and the second panel surface, and thus help to maintain the position of the internal preform within the composite panel.

In another example embodiment, the composite panel may include a reinforcing element between the first panel surface and the second panel surface, away from the internal preform, wherein the reinforcing element is substantially surrounded by the patterned structural portion in at least one plane.

In still another example embodiment, the internal preform of the composite panel comprises a plurality of "chimneys" or channels adapted to allow uncured composite matrix material to flow from one side of the internal preform to the opposite side of the internal preform when the matrix material is infused into the mold. Further, the composite panel can include a plurality of internal preforms to form a complex structure with multiple patterned structural areas. Optionally, the patterned structural portion may comprise at least one substantially rectangular shape, although many shapes and sizes are possible.

Another example embodiment is directed to a method of making a composite panel in a closed mold. The method may include providing a mold bottom having a first surface, providing a mold top having a second surface, and positioning a mold body on the mold bottom. Next, reinforcing material, such as fiberglass scrim, can be positioned on the first surface of the mold bottom. One or more spacers can then be positioned on the reinforcing material to support an internal preform and to space the internal preform apart from the first surface.

Next, an internal preform is placed on the one or more spacers in a position to create a patterned structural region comprising void areas in the mold, and then positioning reinforcing material (such as fiberglass scrim) proximate the second surface of the mold top. After the reinforcing material is installed, the mold top may be placed on the mold body, creating an enclosed cavity. In this example embodiment, the mold can then be filled with a composite matrix material, wherein the composite matrix material flows around the internal preform and the first spacer and substantially fills the void areas in the mold. The composite matrix material is then allowed to cure, forming a patterned structural region around the internal preform.

In another example embodiment, one or more spacers can also be positioned between the internal preform and the reinforcing material on the mold top. The spacers may be pre-cured composite matrix material of the same type that is used to fill the mold, to better create a chemical and mechanical bond between the materials.

Another example embodiment of the method includes positioning a reinforcing element having a first thickness within the void areas in the mold, which may be used to provide high strength areas of the panel where heavy components may be attached with fasteners. For example, such components may be bolted to the panel, with the bolt extending through the reinforcing element.

In a further example embodiment of the method, filling the mold comprises pumping composite material into the mold under pressure. In addition, filling the mold may further comprise creating a vacuum within the mold to draw the uncured material into the mold. The method may further comprise applying a layer of gel coat to the mold bottom prior to positioning the reinforcing material on the first surface of the mold bottom, to produce panels with a high quality exterior finish.

There has thus been outlined, rather broadly, some of the embodiments of the composite panel in order that the detailed description thereof may be better understood, and in order that the present contribution to the art may be better appreciated. There are additional embodiments of the composite panel that will be described hereinafter and that will form the subject matter of the claims appended hereto. In this respect, before explaining at least one embodiment of the composite panel in detail, it is to be understood that the composite panel is not limited in its application to the details of construction or to the arrangements of the components set forth in the following description or illustrated in the drawings. The composite panel is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
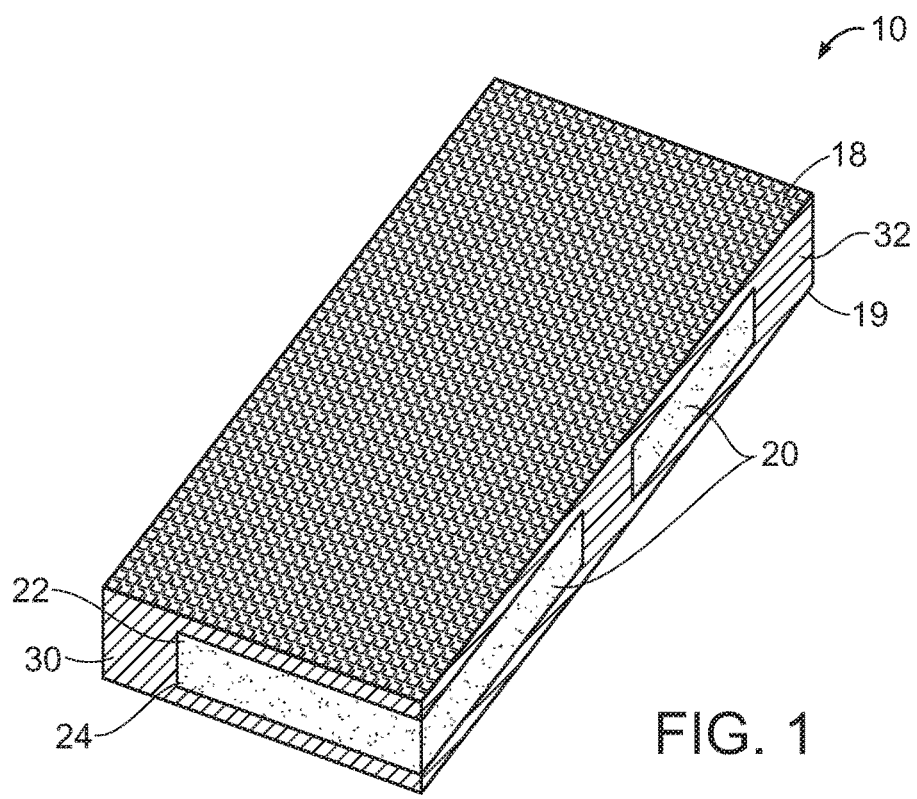
FIG. 1 is a perspective view of a composite panel in accordance with an example embodiment.

A. Overview.

An example panel system generally comprises a composite panel 10 having lightweight internal preforms 20 that create a patterned structural portion 30 of the panel 10. The composite panel 10 has a first panel surface 18 and a second panel surface 19, and at least one internal preform 20 positioned within the composite panel between the first panel surface 18 and the second panel surface 19. The internal preforms 20 may be spaced apart from the first panel surface and the second panel surface to create a composite "skin" or layer of the panel 10. The internal preforms 20 are positioned to at least partially create a patterned structural portion 30 that is generally stronger than the portion of the panel where the internal preforms 20 are located. The patterned extra-strength areas are suitable for placement of heavy fixtures, furniture, etc., as well as fasteners to hold them in place, depending on the application for which the panel 10 is used.

The patterned structural portion 30 comprises a cured composite matrix material 32 that substantially surrounds the internal preforms 20 on at least two sides, and can surround them on all sides, as required. The patterned structural portion 30 is formed in part by a maze of voids in the mold cavity, and is generally stronger than the part of the panel system where the internal preform is positioned. The internal preforms 20 are generally very low-density material compared to the composite matrix material.

The composite panel system may further include a reinforcing layer 14 (such as fiberglass scrim or other reinforcing material) near the first panel surface 18, and may also include a second reinforcing layer near the second panel surface 19. In applications where a high-quality exterior finish is required, the panel system may optionally include a gelcoat layer 16 over the first panel surface 18 or the second panel surface 19.

The first panel surface 18 and the second panel surface 19 of the panel 10 may be substantially coplanar, for use as floor or wall panels, or even as boat transoms, to name just a few possible examples. Other shapes are possible as well. For example, the manufacturing process and components disclosed here could even be used to create spheres and other shapes. Further, the internal preforms 20 may also have two surfaces that are substantially coplanar with the first panel surface 18 and the second panel surface 19. The panel system may further include one or more spacers 40 positioned between the internal preforms 20 and the first panel surface 18 and between the internal preforms 20 and the second panel surface 19, and thus help to maintain the position of the internal preform within the panel during the closed molding process, or any other process by which the panels are made.

In addition to the basic panel 10 shown in FIG. 1, the panel system may also include a reinforcing element 12 between the first panel surface and the second panel surface, away from the internal preform, wherein the reinforcing element 12 is substantially surrounded by the patterned structural portion 30 in at least one plane.

In still another example embodiment, the internal preform 20 of the panel 10 comprises a plurality of "chimneys" or channels 28 adapted to allow uncured composite matrix material 32 to flow from one side of the internal preform 20 to the opposite side when the matrix material is infused into the mold 50. Further, the panel 10 can include a plurality of internal preforms 20 to form a complex patterned structural portion 30. Optionally, the patterned structural portion 30 may comprise at least one substantially rectangular shape, although many shapes and sizes are possible.

Another example embodiment is directed to a method of making a composite panel 10 in a closed mold 50, or alternatively, in an open mold. The method may include providing a mold bottom 51, providing a mold top 55, and positioning a mold body 52 on the mold bottom. Next, reinforcing material, such as fiberglass scrim, can be positioned on the mold bottom 51. One or more spacers 40 can then be positioned on the reinforcing layer 14 to support an internal preform 20 and to space the internal preform 20 apart from the first surface 18 of the panel.

Next, an internal preform 20 is placed on the one or more spacers in a position to create a patterned structural portion 30 corresponding to void areas in the mold, and then positioning another layer of reinforcing material (such as fiberglass scrim) proximate the mold top. After the reinforcing layer 14 is in place, the mold top 55 may be placed on the mold body 52, creating a substantially enclosed cavity. In this example embodiment, the mold 50 can then be filled with a composite core matrix/resin material 32, wherein the composite matrix material flows around the internal preform(s) 20 and the first spacer 40 and substantially fills the void areas in the mold 50. The composite matrix material 32 is then allowed to cure, forming a patterned structural region 30 around the internal preform 20.

In another example embodiment, one or more spacers 40 can also be positioned between the internal preform 20 and the reinforcing layer 14 on the mold top. The spacers 40 may be pre-cured composite matrix material of the same type that is used to fill the mold, to better create a chemical and mechanical bond between the materials.

Another example embodiment of the method includes positioning a reinforcing element 12 within the void areas in the mold, which may be used to provide high-strength areas of the panel where heavy components may be attached with fasteners. For example, such components may be bolted to the panel, with the bolt extending through the reinforcing element.

In a further example embodiment of the method, filling the mold comprises filling the mold with composite matrix material 32. For example, the material can be pumped into the mold 50 under pressure. In addition, filling the mold may further comprise creating a vacuum within the mold 50 to draw the uncured material 32 into the mold. The method may further comprise applying a layer of gelcoat to the mold bottom prior to positioning the reinforcing layer on the mold bottom, to produce panels with a high quality exterior finish.

B. Panel.

Figure 4:
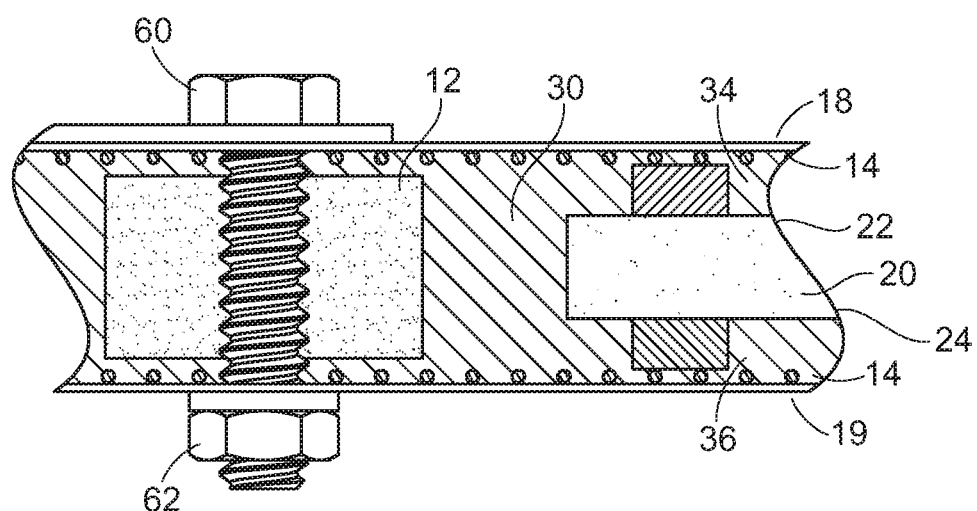
FIG. 4 is an alternative sectional view of a composite panel in accordance with an example embodiment.

FIG. 1 illustrates a lightweight panel 10 comprising two lightweight internal preforms 20 surrounded by cured composite matrix material 32, which forms a patterned structural portion 30. For illustration purposes, FIG. 1 shows a cut-away view panel 10 so that the internal preforms are visible. An actual finished panel 10 will appear to be simply a solid composite panel, but will be much lighter in weight, as described herein. Internally, a panel 10 may also include high strength reinforcing elements 12 for supporting fasteners, such as nuts and bolts, etc., as shown in FIG. 4. The reinforcing elements 12 may be made of virtually any structural material capable of being imbedded in the panels, such as wood, cured resin, or preformed composite materials. The reinforcing elements 12 may be used, for example, where very high strength is required, such as mounting motors on boat transoms, as well as other applications.

Figure 3:
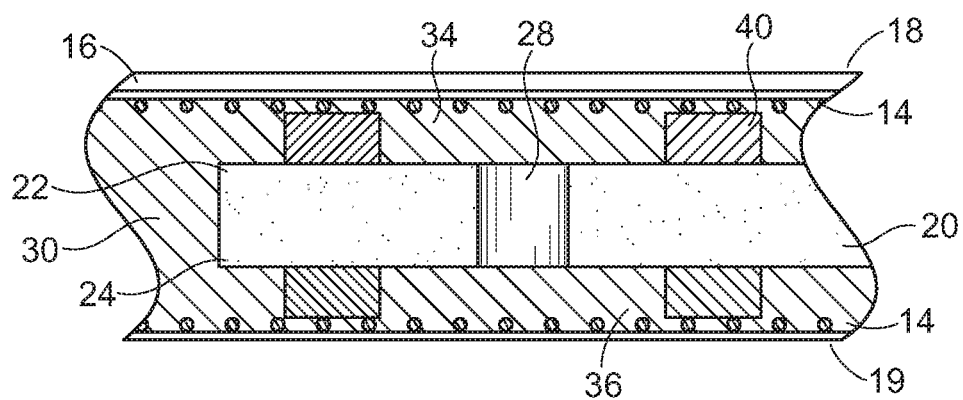
FIG. 3 is a sectional view of a composite panel in accordance with an example embodiment.

As shown in FIGS. 3 and 4, as with conventional panels, the panels 10 of the example embodiments may include a reinforcing layer 14 near one or both panel surfaces 18 and 19. For example, the reinforcing layers 14 may comprise fiberglass scrim. When the composite core matrix material 32 surrounds the reinforcing layers and is subsequently cured, a composite panel 10 is formed, albeit one with internal regions with lower density than a panel made in a conventional way, with a continuous cured matrix material and uniform density throughout.

C. Internal Preform.

Figure 2:
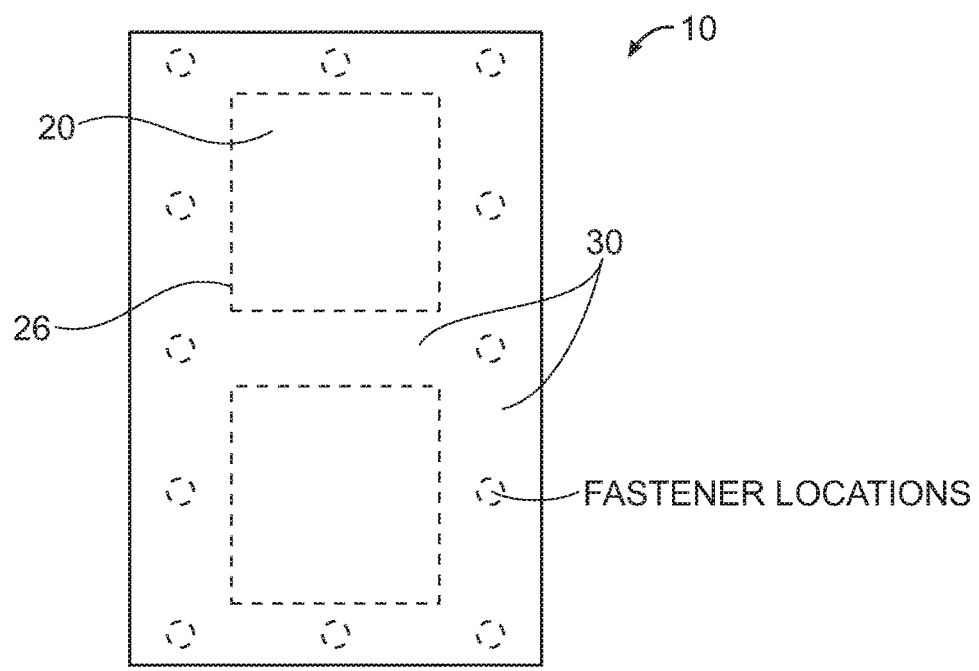
FIG. 2 is a front view of a composite panel in accordance with an example embodiment.

To help reduce the overall weight of the composite panel, one or more internal preforms 20 may be used, as best shown in FIGS. 1 and 2. The internal preforms can be made from urethane foam, Styrofoam, etc. For example, urethane foam boards with about the same density of Styrofoam can provide a good chemical and mechanical bond to the composite matrix material that surrounds the preforms 20. As an example of the weight savings that may be achieved, the internal preforms may have a density that is only about ten percent of the density of the surrounding composite matrix material, which provides strength where needed, but is also heavier than the internal preforms 20.

As shown in FIG. 2, any number of internal preforms 20 may be used to create a pattern of lightweight portions and stronger patterned structural portions 30 of the panels 10. As also shown, the internal preforms 20 may be rectangular, substantially board-shaped components with surfaces that are or may be coplanar with the surfaces of the panels, although very complex shapes are also possible, and it is not even necessary that the internal preforms are flat, or have parallel sides.

When the internal preforms 20 are shaped as shown in FIGS. 1 and 2, they may include a first preform side 22, a second preform side 24, and a perimeter 26. In any shape, they may also include multiple "chimneys" or channels 28. The chimneys 28 are useful when the panels are being formed, as they allow composite matrix material to flow from one side of the panel to the other, and thus aid in ensuring that the matrix material 32 flows from one side of the preform to the other during the molding process.

The first preform side 22 may face panel surface 18, and the second preform side 24 may face panel surface 19, while cured composite matrix material 32 fills the space between the internal preform 20 and the outer surfaces 18 and 19 of the panel 10.

D. Patterned Structural Portion.

As best shown in FIGS. 1 and 2, by using molding techniques but with extremely lightweight internal preforms 20 held in place during the molding process, a very lightweight composite panel can be formed. However, the lightweight panels are not merely placed wherever they will fit, but are instead shaped and placed accurately so that the remaining portion of the panel 10 will comprise a patterned structural portion 30. For example, FIG. 2 shows, in simplified form, patterned structural portion 30 in the general shape of a rectangle surrounding two squares (formed by the internal preforms) that do not make up part of the patterned structural portion 30.

In the example embodiment of FIG. 2, if the panel were used as a floorboard (or transom) in a boat, mobile home, or recreational vehicle, for example, the preforms 20 might represent areas where high relative strength is not required, such as a portion of the floor with nothing mounted or supported above it. In contrast, the patterned structural portion 30 may represent a portion of the floor where more strength is required, such as mounting an appliance or piece of equipment. Potential fastener locations are also shown in FIG. 2. The patterned structural portions of the panels 10 can be used to receive fasteners to hold down appliances or walls, in addition to supporting greater weights than would be desirable for the lightweight portions formed by the internal preforms 20.

Figure 5:
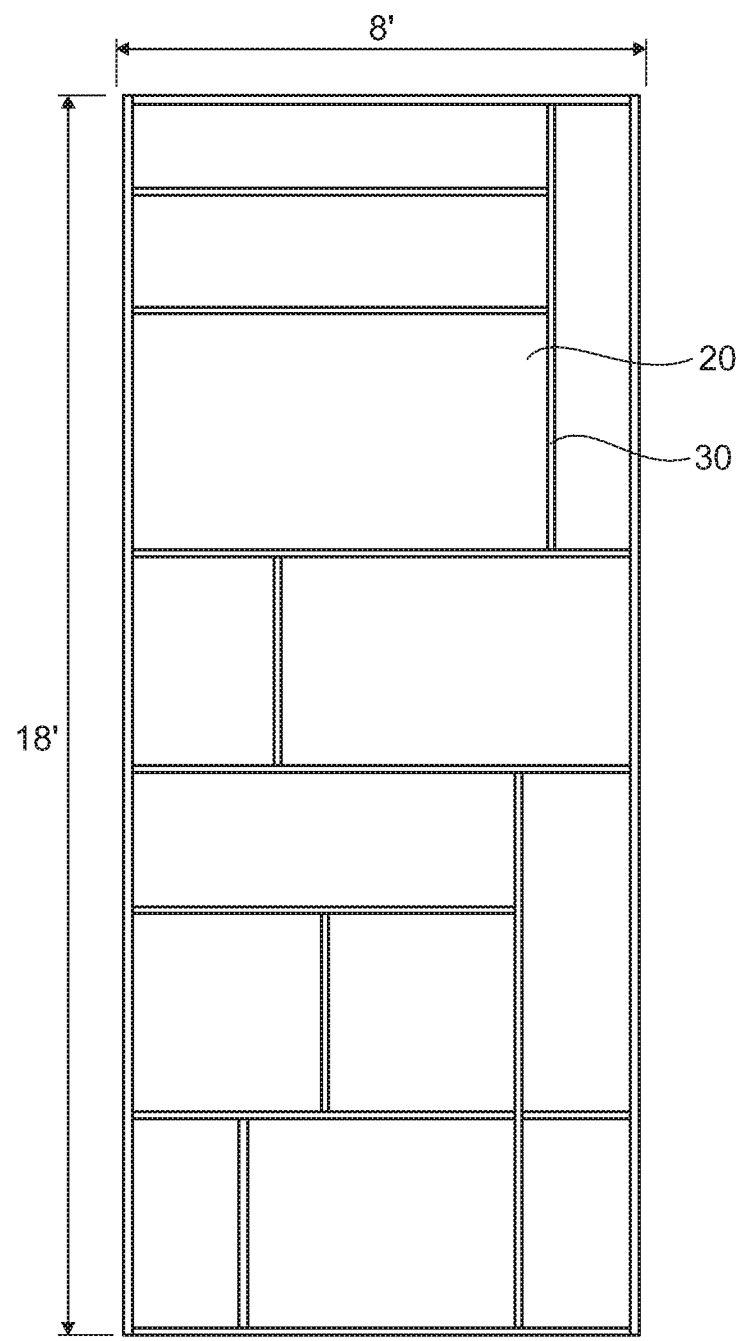
FIG. 5 is a floorplan for which a composite panel in accordance with an example embodiment can be used.

The patterned structural portion 30 of panel 10 can have a highly complex shape, and may be made using, for example, a closed-mold process where a composite core matrix/resin material is pumped into a mold that already has the internal preforms 20 held in place or positioned as needed. FIG. 2 shows a simplified pattern for illustration purposes, while FIG. 5 illustrates a much more complex pattern of the type that is possible. As shown in FIG. 5, the patterned structural portion can replicate a frame constructed with wood, metal, or other materials, but can be made from the composite matrix/resin materials and internal preforms as described herein. In FIG. 5, the patterned structural portion 30 appears as the thinner elements that make up the pattern, similar to wooden studs in a stud wall.

In some example embodiments, the composite core matrix/resin material that comprises the patterned structural portion 30 may comprise one or more hollow or solid microsphere discontinuous portions disposed in a continuous encapsulating resin. In certain embodiments, the hollow or solid microspheres are selected from the group consisting of plastic microspheres, glass microspheres, ceramic microspheres, polyvinyl chloride (PVC) microspheres, acrylic microspheres, and any combinations thereof.

Hollow plastic microspheres are small spherical plastic particles. The microspheres consist of a polymer shell encapsulating a gas. When the gas inside the shell is heated, it increases its pressure and the thermoplastic shell softens, resulting in a dramatic increase in the volume of the microspheres. In certain embodiments, when fully expanded, the volume of the microspheres increases more than about 40 times. Glass microspheres are microscopic spheres of glass manufactured for a wide variety of uses in research, medicine, consumer goods and various industries.

Glass microspheres are usually between 1 and 1000 micrometers in diameter, although the sizes can range from 100 nanometers to 5 millimeters in diameter. Hollow glass microspheres, sometimes termed microballoons or glass bubbles, have diameters ranging from 10 to 300 micrometers. The use of hollow microspheres to form the patterned structural portion 30, as well as the thinner layers above and below the internal preforms, further reduces density and improves the thermal and acoustic insulation of the panels, while increasing the relative stiffness of the original polymer.

E. Operation and Construction of Preferred Embodiment.

Figure 6:
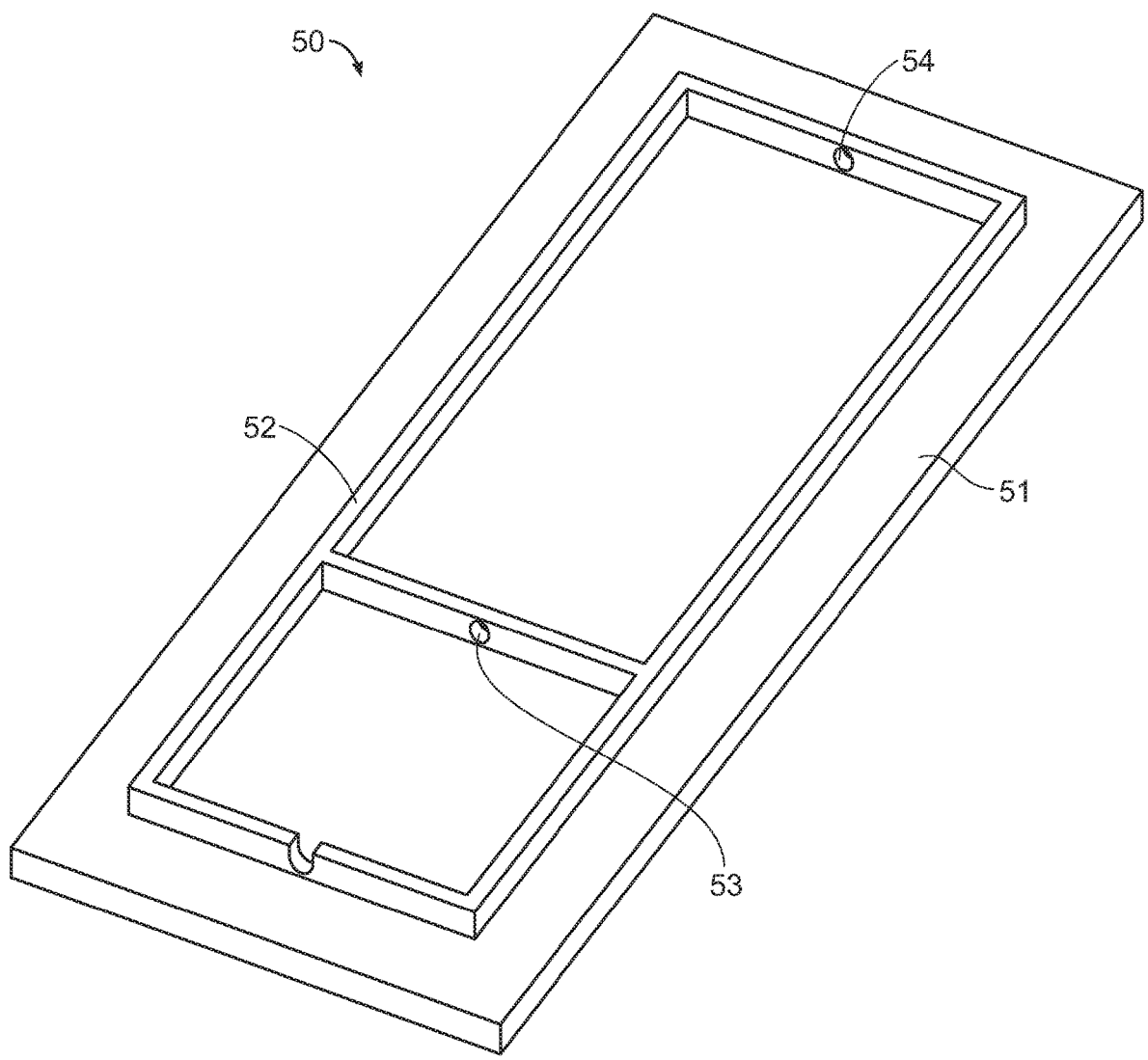
FIG. 6 is a perspective view of a mold body usable for making a composite panel in accordance with an example embodiment.
Figure 7:
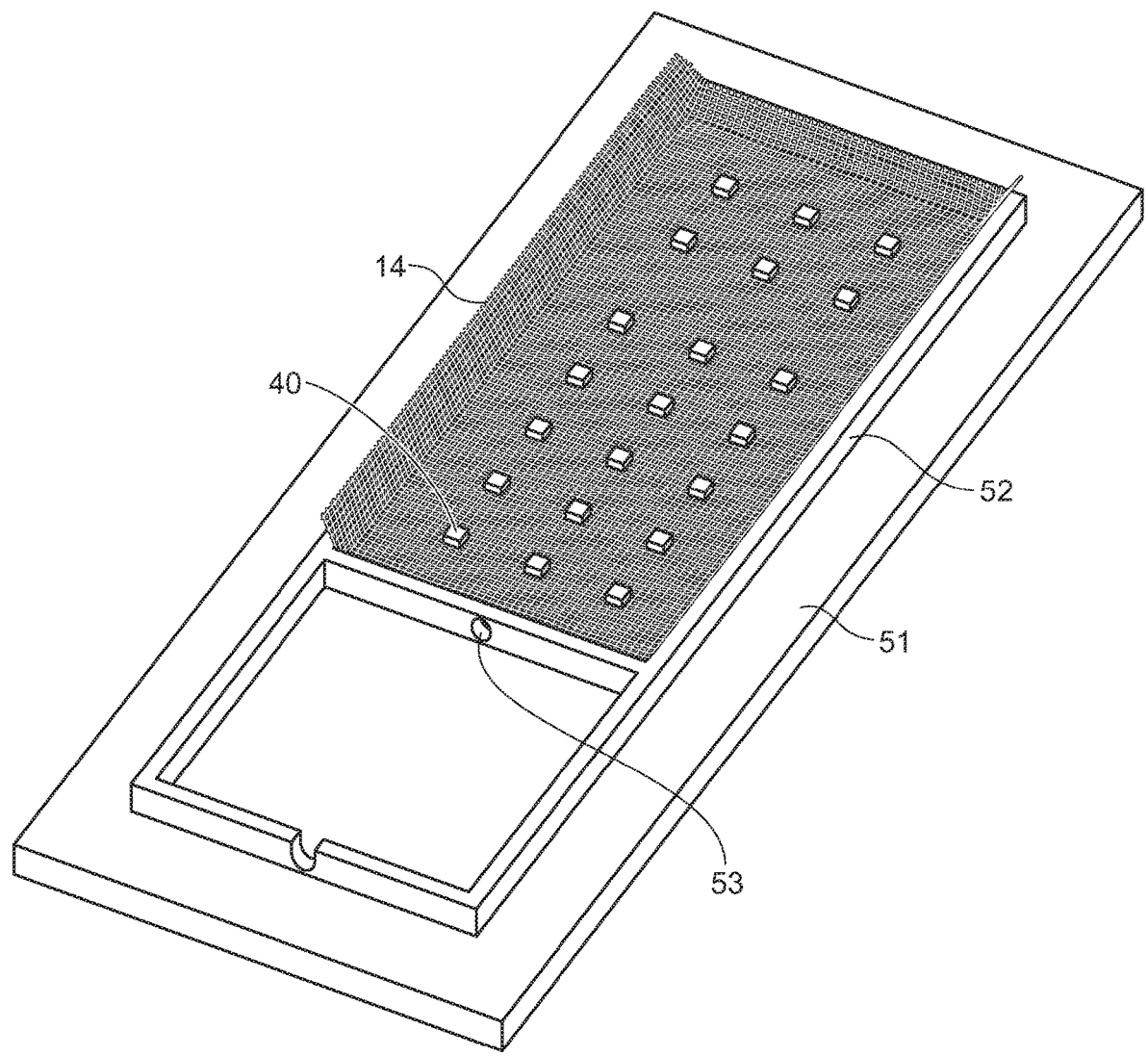
FIG. 7 is a perspective view of a mold body with a reinforcing layer in place, usable for making a composite panel in accordance with an example embodiment.

In use, the panel 10 is first created in a closed mold 50, such as the mold shown in FIG. 6. The mold comprises a mold body 52 that rests on a mold bottom 51. The mold body 52 may be made of silicone or similar material to aid in removing the cured panels from the mold, since many matrix materials will not adhere to the silicone. Initially, a reinforcing layer 14, such as fiberglass scrim, is installed in the portion of the mold in which the panel will be formed, as shown in FIG. 7. Next, multiple spacers 40 are installed or positioned where the internal preforms 20 are to be placed. The internal preforms 20 serve the purpose of holding the internal preforms 20 away from what will be the surface of the finished panel, thus creating a layer of cured composite matrix/resin material 32 between the internal preforms 20 and the outer surfaces of the panel 10. Because of the spacers 40, the layers thus formed will have a relatively uniform thickness. The spacers 40 may be used on one or both sides of the internal preforms 20. As shown in FIG. 3, the panel 10 thus includes a first layer portion 34 and a second layer portion 36, which are formed at the same time, and from the same material, as the patterned structural portion 30 that flows into the mold 50.

The spacers may be made by molding a flat sheet out of the same or a similar matrix material that will be used to form panel 10, thus allowing for a strong chemical and mechanical bond between the spacers 40 and the layers formed by the matrix material. Once such a flat sheet is formed and cured, the spacers may be made by scoring the sheet and separating the spacers.

As is known, the reinforcing layer 14 adds strength to the panels, as with many composite construction techniques where a matrix material surrounds and encapsulates a reinforcing material.

Figure 8:
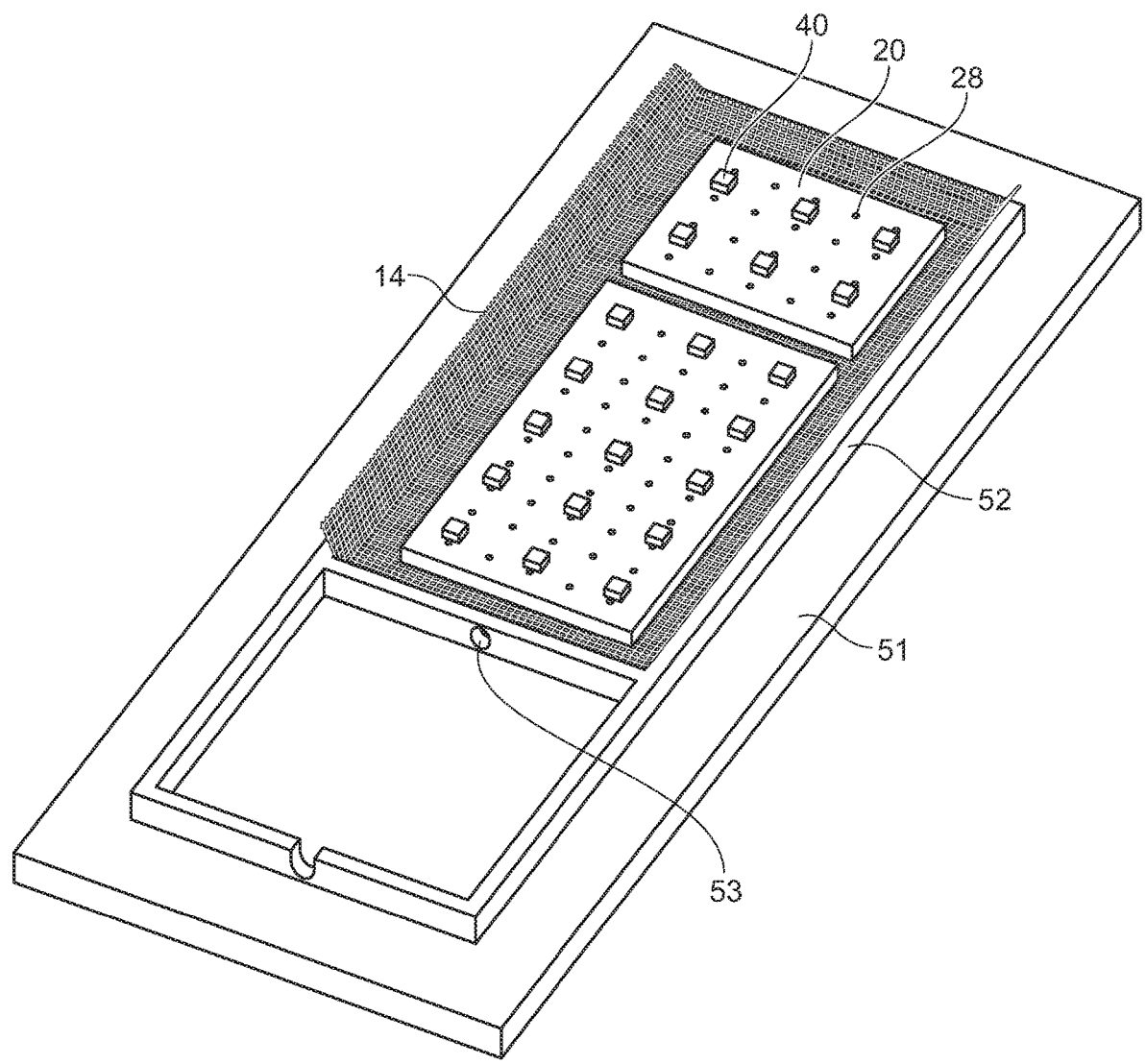
FIG. 8 is another perspective view of a mold body with a reinforcing layer and internal preforms in place, usable for making a composite panel in accordance with an example embodiment.

After the first set of spacers 40 are positioned, as shown in FIG. 7, the internal preforms 20 are positioned on the spacers 40 so as to create a "maze" of voids where the matrix material 32 will be infused into the mold 50 to create the patterned structural portion 30. In the illustrative pattern of FIG. 8, the patterned structural portion 30 is in the shape of a generally rectangular frame with a crossbar. Next, another set of spacers 40 are placed on top of the internal preforms 20, as shown in FIG. 8. FIG. 3 also shows, in cross-section, the resulting internal features of the panel 10 that is thus formed.

Figure 9:
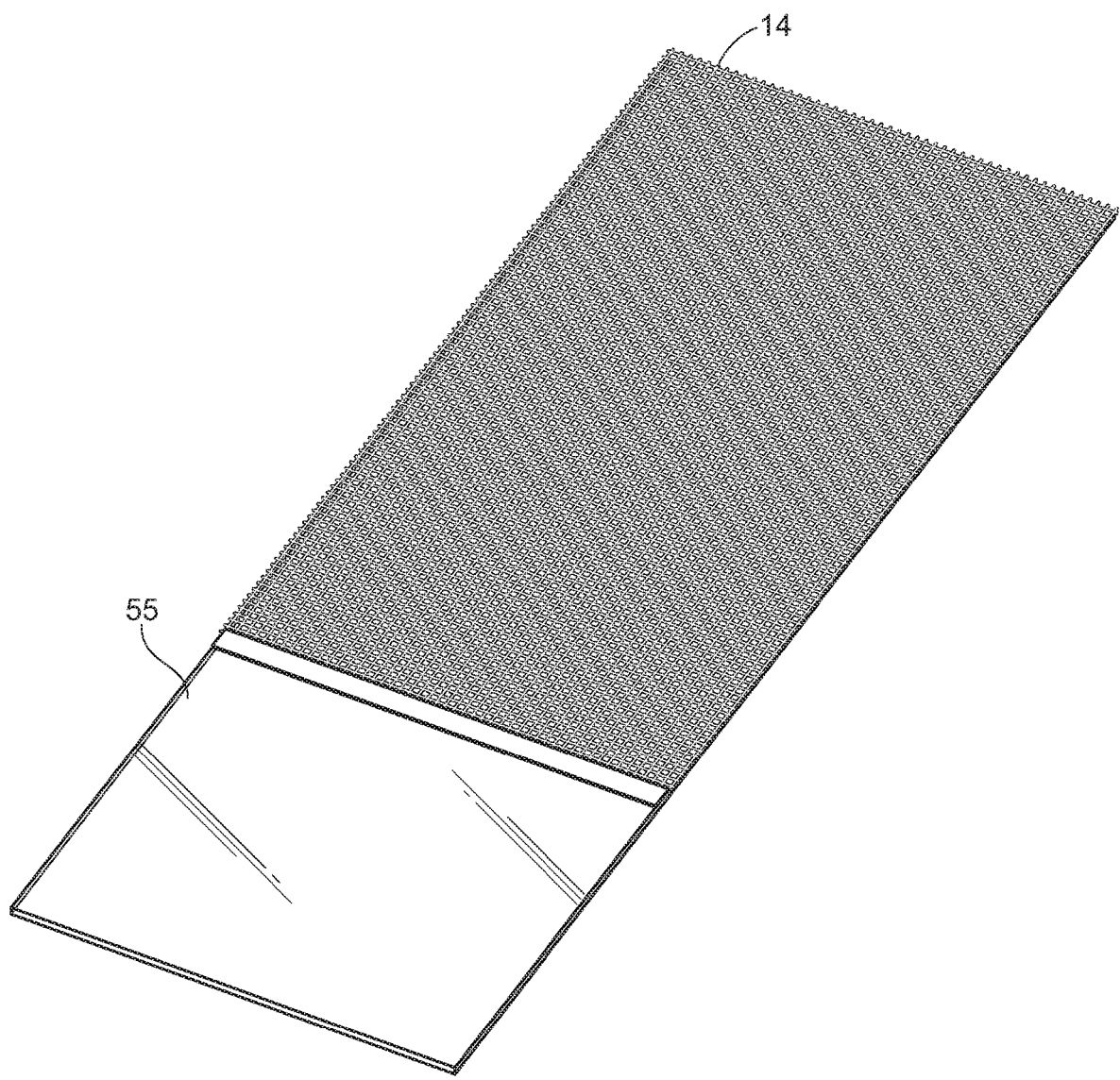
FIG. 9 is a perspective view of a mold top with a reinforcing layer in place, usable for making a composite panel in accordance with an example embodiment.

Next, another reinforcing layer 14 is installed on a mold top 55, which may be a glass top to allow users to view the process and ensure quality. Alternatively, the second reinforcing layer may simply be positioned between the internal preform or spacers and the mold top 55. FIG. 9 illustrates an example embodiment of fiberglass scrim installed on a mold top 55 prior to placement on the mold body 52.

Figure 10:
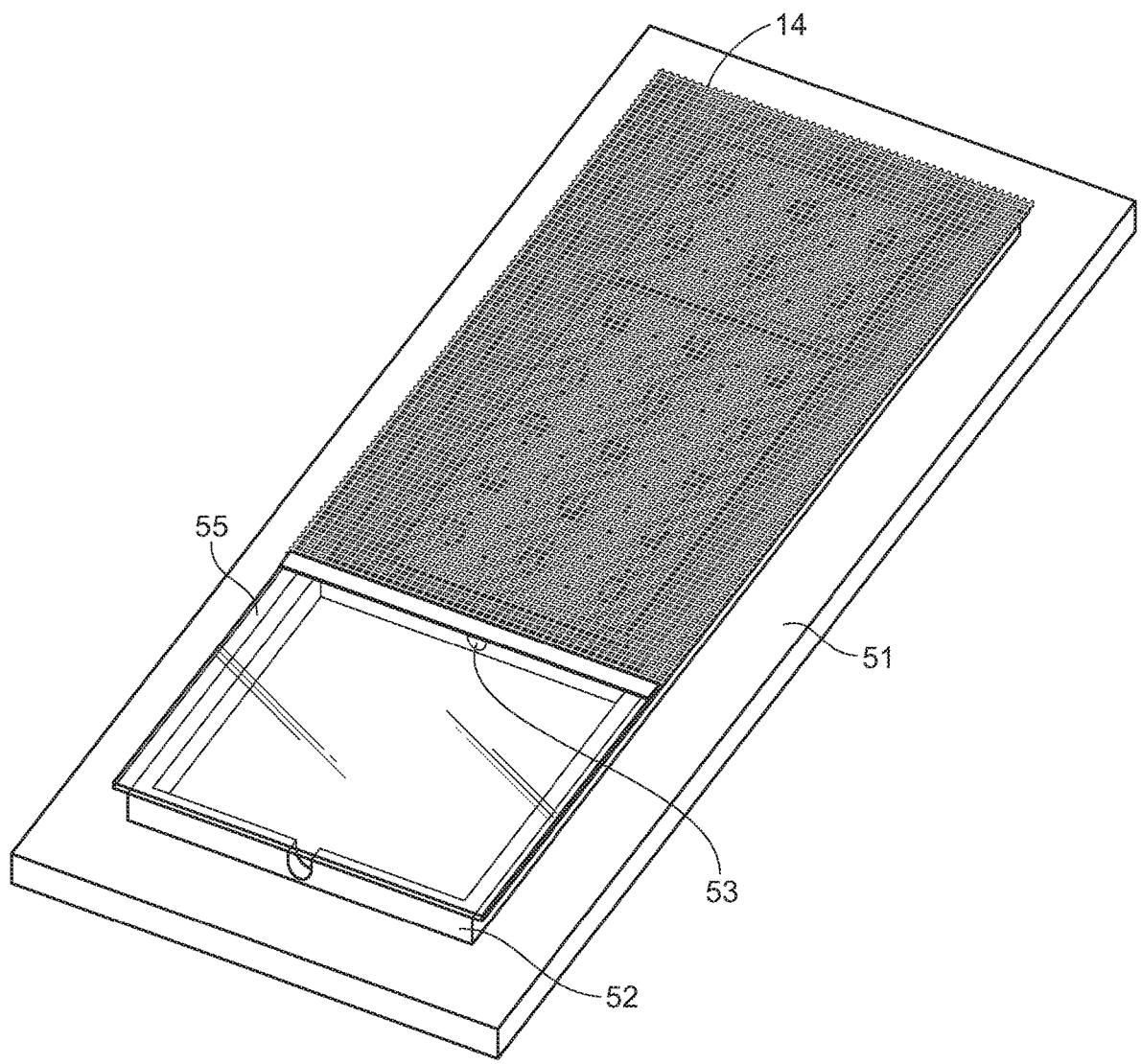
FIG. 10 is a perspective view of a mold bottom, mold body, and mold top in place, usable for making a composite panel in accordance with an example embodiment.
Figure 11:
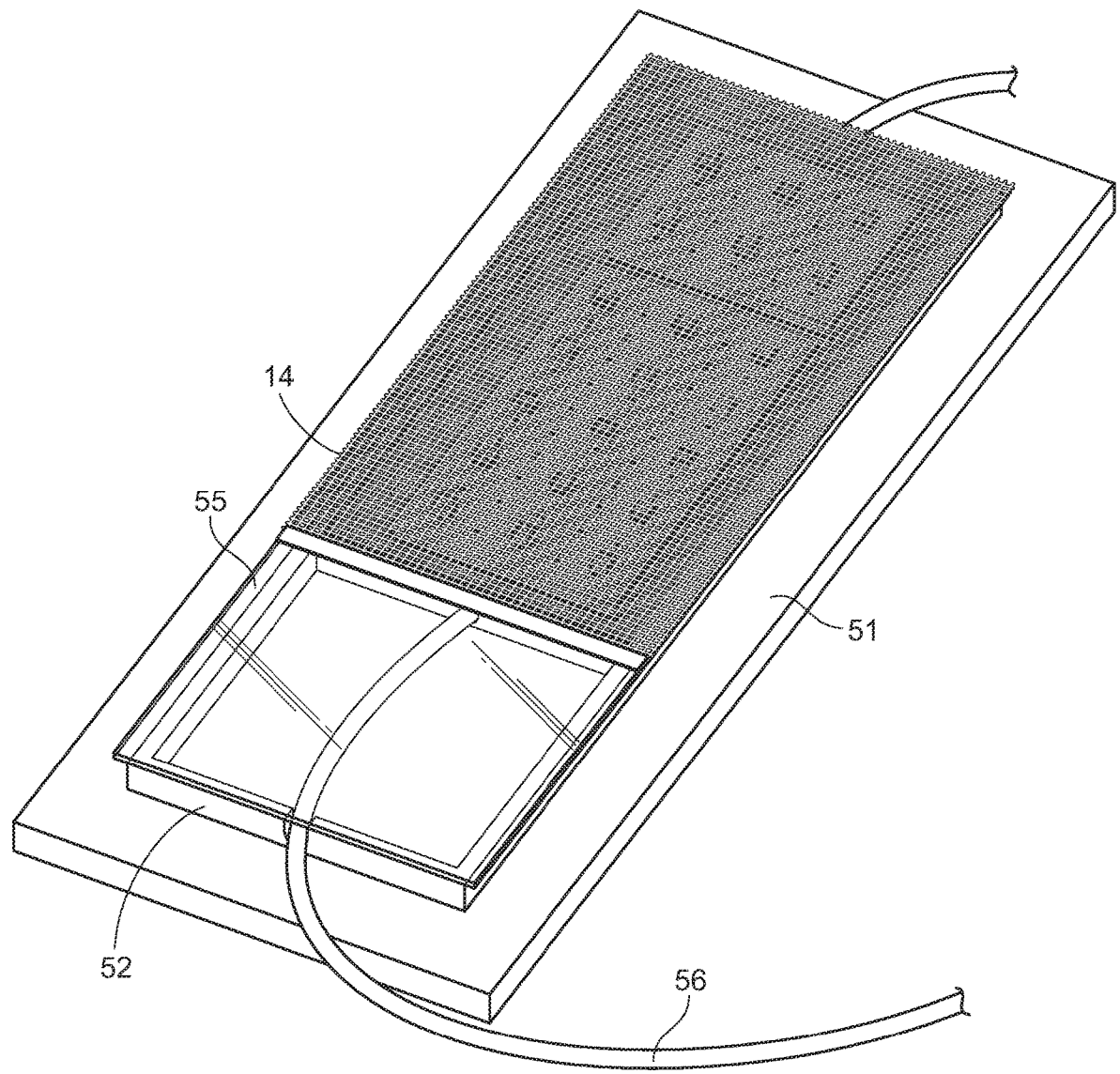
FIG. 11 is a perspective view of an assembled, closed mold body showing tubing for infusing composite matrix material into the mold, usable for making a composite panel in accordance with an example embodiment.

Next, the mold top 55 is placed on the mold body 52 with the other reinforcing layer 14, spacers 40, and internal preforms 20 placed and positioned as needed to form a panel 10 with a patterned structural portion 30 of the desired shape, as shown in FIGS. 10 and 11.

As noted above, the patterned structural portions 30 may be significantly stronger than the panel portions that include the internal preforms 20, which are extremely light and serve to help form the patterned structural portions 30 by forming a maze or void pattern where composite matrix material can flow during the closed mold process.

When the uncured composite core matrix material is introduced into the mold (for example, infused into the mold by a supply tube 56 coupled to infusion port 53), it flows into the voids in the mold, and may be aided in flow by a vacuum tube connected to vacuum port 54 at the end of the mold body opposite the infusion port 53. In addition, the flow of the composite matrix material can be improved by the chimneys 28 in internal preforms 20, which allow the matrix material to flow from one side of the preform to another, such as from the bottom to the top.

Thus, the uncured composite matrix material can flow within the mold to all the spaces/voids not occupied by other structures within the panel 10. The composite matrix material will later cure to form a bottom sheet, the patterned structural portion, and a top sheet. The other structures that may be in the panels 10 are best shown in FIG. 4, and include a reinforcing element 12, reinforcing layer 14, internal preform 20, and spacers 40.

When panels 10 are formed as shown in FIG. 3 (although other configurations are possible), the outer surfaces of the panel are substantially coplanar with the surfaces of the internal preforms 20, which are also panel shaped. Due to the spacers 40 and the mold shape, the composite core matrix material will form sheets or layer portions between the outer surfaces of the panel and the internal preforms, so that from the outside, the panels appear to be made as a single, unitary structure that does not reveal the internal differences shown in FIGS. 3 and 4 (for example).

Once the mold is filled with matrix material, the infusion is stopped and the material is allowed to cure due to elevated pressure, temperature, moisture, time, chemical reaction, etc.

If desired for an improved, high-quality finish, or for additional environmental protection, an optional gelcoat layer 16 can be applied to one or both exterior surfaces of the panel 10.

In addition to the relatively high-strength patterned structural portions 30 formed by the cured matrix material, the panels may also include special reinforcing elements 12 that are encapsulated/surrounded by the matrix material. As shown in FIG. 4, such reinforcing elements 12 may be used where additional strength is required to support heavy structures (a portion of which is shown as item 64), or to accommodate additional fasteners, such as screws, bolts, nails, etc. FIG. 4 illustrates a mounting portion 64 of a mounted component supported by a bolt 60, nut 62, and reinforcing element 12.

The panels 10 made as described here have several advantages over other types of panels. For example, once the panels are cured, they require no further assembly and thus comprise fully assembled, solid one piece formed composite panels that are lightweight, strong, resistant to the outside environment, and have good thermal and sound insulating properties.

The preceding descriptions and accompanying figures are merely exemplary embodiments of panels 10. Other structures may be made using the techniques and material described herein, and may not necessarily even be in the form of flat panels. As another example, the internal preforms and resulting patterned structural portions do not have to have the forms and shapes shown (e.g., rectangles, squares, and "stud" shapes), but can instead have complex shapes and different proportions, such as stars, triangles, or other geometric shapes and patterns.

Unless otherwise defined, all technical and scientific terms used herein have the same meaning as commonly understood by one of ordinary skill in the art to which this invention belongs. Although methods and materials similar to or equivalent to those described herein can be used in the practice or testing of the composite panel, suitable methods and materials are described above. All publications, patent applications, patents, and other references mentioned herein are incorporated by reference in their entirety to the extent allowed by applicable law and regulations. The composite panel may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A composite panel, comprising:
a first internal preform comprising a first preform side, a second preform side, and a perimeter, the first internal preform positioned within the panel between a first panel surface and a second panel surface, wherein the first internal preform is spaced apart from the first panel surface or the second panel surface;
wherein the first preform side of the first internal preform faces the first panel surface;
wherein the second preform side of the first internal preform faces the second panel surface;
a first layer portion adjacent the first preform side of the first internal preform;
a second layer portion adjacent the second preform side of the first internal preform; and
a patterned structural portion surrounding the first internal preform on at least three sides or directions, wherein the structural portion is adapted to receive a plurality of fasteners or to provide structural support;
wherein the first layer portion, the second layer portion, and the patterned structural portion are comprised of a cured composite matrix material, wherein a density of the cured composite matrix material is greater than a density of the first internal preform.

2. The composite panel of claim 1, wherein the structural portion substantially surrounds the first internal preform on at least four sides or directions.

3. The composite panel of claim 1, wherein the patterned structural portion, the first layer portion, and the second layer portion substantially surround the first internal preform on at least six sides or directions.

4. The composite panel of claim 1, further comprising a first reinforcing layer proximate the first panel surface and a second reinforcing layer proximate the second panel surface.

5. The composite panel of claim 1, further comprising a gel coat layer over the first panel surface.

6. The composite panel of claim 1, wherein the first panel surface and the second panel surface are substantially coplanar.

7. The composite panel of claim 6, wherein the first internal preform comprises two surfaces that are substantially coplanar with the first panel surface and the second panel surface.

8. The composite panel of claim 7, further comprising a plurality of spacers positioned between the internal preform and the first panel surface and between the internal preform and the second panel surface.

9. The composite panel of claim 8, further comprising a reinforcing element between the first panel surface and the second panel surface, wherein the reinforcing element is substantially surrounded by the patterned structural portion in at least one plane.

10. The composite panel of claim 1, wherein the first internal preform comprises a plurality of channels adapted to allow uncured composite matrix material to flow from a first side of the internal preform to a second side of the internal preform.

11. The composite panel of claim 1, wherein the first internal preform comprises a plurality of internal preforms.

12. The composite panel of claim 1, wherein the cured composite matrix material comprises microspheres.

13. A method of making a composite panel according to claim 1 in a mold, comprising:
   providing a mold bottom;
   providing a mold top;
   positioning a mold body on the mold bottom;
   positioning a first reinforcing layer on the mold bottom;
   positioning a first spacer on the reinforcing material to support an internal preform and to space the internal preform apart from the mold bottom;
   placing the internal preform on the first spacer in a position to create a patterned structural portion comprising void areas in the mold;
   positioning a second reinforcing layer between the internal preform and the mold top;
   installing the mold top on the mold body;
   filling the mold with a composite matrix material, wherein the composite matrix material flows around the internal preform and the first spacer and substantially fills the void areas in the mold; and
   allowing the composite matrix material to cure, forming a patterned structural region around the internal preform.

14. The method of claim 13, further comprising positioning a second spacer between the internal preform and the second reinforcing layer.

15. The method of claim 13, wherein the first spacer comprises a plurality of spacers.

16. The method of claim 13, wherein the first spacer comprises the same composite matrix material that is used to fill the mold.

17. The method of claim 13, further comprising:
   positioning a reinforcing element having a first thickness within the void areas in the mold.

18. The method of claim 13, wherein filling the mold comprises pumping composite matrix material into the mold under pressure.

19. The method of claim 18, wherein filling the mold further comprises creating a vacuum within the mold.

20. The method of claim 13, wherein the composite matrix material comprises microspheres.

* * * * *